(12) United States Patent
Kuroda et al.

(10) Patent No.: US 7,535,657 B2
(45) Date of Patent: May 19, 2009

(54) ZOOM LENS SYSTEM AND IMAGING DEVICE

(75) Inventors: Daisuke Kuroda, Kanagawa (JP); Masafumi Sueyoshi, Kanagawa (JP); Kazuya Watanabe, Saitama (JP)

(73) Assignees: Sony Corporation (JP); Tamron Co., Ltd. (JP)

( * ) Notice: Subject to any disclaimer, the term of this patent is extended or adjusted under 35 U.S.C. 154(b) by 74 days.

(21) Appl. No.: 11/885,365

(22) PCT Filed: Feb. 15, 2006

(86) PCT No.: PCT/JP2006/302662
§ 371 (c)(1),
(2), (4) Date: Aug. 30, 2007

(87) PCT Pub. No.: WO2006/095543
PCT Pub. Date: Sep. 14, 2006

(65) Prior Publication Data
US 2008/0218875 A1  Sep. 11, 2008

(30) Foreign Application Priority Data
Mar. 11, 2005  (JP)  .............................. 2005-068901

(51) Int. Cl.
*G02B 9/62* (2006.01)
(52) U.S. Cl. .................. 359/757; 359/676; 359/683
(58) Field of Classification Search .............. 359/657, 359/658, 676, 681–684, 713, 750, 751, 752, 359/755, 756, 757
See application file for complete search history.

(56) References Cited

U.S. PATENT DOCUMENTS 5,189,557 A * 2/1993 Endo .......................... 359/683

(Continued)

FOREIGN PATENT DOCUMENTS

JP  04-146407  5/1992

(Continued)

OTHER PUBLICATIONS

Extended European Search Report dated Jun. 16, 2008 for corresponding European Application No. 06 71 3803.

*Primary Examiner*—Joseph Martinez
(74) *Attorney, Agent, or Firm*—Rader Fishman & Grauer PLLC; Ronald P. Kananaen

(57) ABSTRACT

There is provided a zoom lens system including at least a first lens group GR1 having a positive refractive power, a second lens group GR2 having a negative refractive power, a third lens group GR3 having a positive refractive power, a fourth lens group GR4 having a negative refractive power, a fifth lens group GR5 having a positive refractive power, and a sixth lens group GR6 having a negative refractive power, arranged sequentially from the object side. Zoom ratio is varied by changing the distance between the adjacent lens groups. The distance, taken as DW(i-j), between the i- and j-th lens groups at the wide angle end during at-infinity imaging and that, taken as DT(i-j), between the i- and j-th lens groups at the telephoto end during at-infinity imaging meet the following conditions (1), (2), (3), (4) and (5)

DW(1-2)<DT(1-2)  (1)

DW(2-3)>DT(2-3)  (2)

DW(3-4)>DT(3-4)  (3)

DW(4-5)<DT(4-5)  (4)

DW(5-6)<DT(5-6)  (5)

and focusing is made by moving the fourth lens group GR4 axially of the lenses.

16 Claims, 13 Drawing Sheets

U.S. PATENT DOCUMENTS 5,691,851 A * 11/1997 Nishio et al. ................ 359/683

FOREIGN PATENT DOCUMENTS

| JP | 06-034885 | 2/1994 |
| JP | 07-77656 | 3/1995 |
| JP | 09-243912 | 9/1997 |
| JP | 11-174325 | 7/1999 |
| JP | 2001-350093 | 12/2001 |

* cited by examiner

ZOOM LENS SYSTEM AND IMAGING DEVICE

TECHNICAL FIELD

The present invention relates to a zoom lens system and an imaging device using the zoom lens system.

This application claims the priority of the Japanese Patent Application No. 2005-068901 filed in the Japanese Patent Office on Mar. 11, 2005, the entirety of which is incorporated by reference herein.

BACKGROUND ART

There have been used in the past imaging devices using a solid-state image sensing device, such as a digital still camera or the like. Among the imaging devices of this type, the digital still cameras need a highly compact zoom lens system in which a single lens unit is capable of a wide range of imaging function from wide angle to telephoto and has a high performance of imaging that is optimum for high-speed auto-focusing and does not depend upon an object distance.

To meet the above demand, a higher room-ratio zoom lens system has been proposed. Zoom lens systems of this type are disclosed in the Japanese Published Unexamined Patent Application Nos. H04-146407 (Patent Document 1) and H11-174324 (Patent Document 2). Each of the zoom lenses described in these Patent Documents is formed from a group of six lenses, or convex, concave, convex, concave, convex and concave to have an increased zoom ratio.

DISCLOSURE OF THE INVENTION

The zoom lens disclosed in each of Patent Documents 1 and 2 is a replacement lens used in a single-lens reflex camera or the like. Since it should be long enough in back focal length to have a space where a flip-up mirror is to be disposed and the like, it cannot easily be designed for a smaller size and higher wide-angle imaging function.

Also, since focusing is made by moving mainly a first or second lens group in combination with a manual focusing mechanism, for example, or in any other way, a fluctuation of a lens-to-subject distance will cause the angle of view to vary largely.

In the auto-focusing (AF) of the replacement lens in the single-lens reflex camera or the like, difference in ranging system will not cause any problematic variation of the angle of view during focusing. In the auto-focusing in an integrated-lens type digital still camera or the like, however, since a focal point is calculated based on data obtained by image sensing devices, variation of the angle of view during focusing will be very difficult to cope with.

Further, moving a large group of lenses as a focusing group in a mechanical structure as well leads to a larger driving mechanism, which will have a great influence on the speed of response of AF.

It is therefore desirable to overcome the above-mentioned drawbacks of the related art by providing a zoom lens system advantageously usable in an integrated-lens type imaging device such as a camcorder, digital still camera or the like.

It is also desirable to provide an imaging device using a compact zoom lens system capable of a wide range of imaging function from wide angle to telephoto and having a high performance of imaging that is optimum for high-speed auto-focusing (AF) and does not depend upon an object distance.

According to an embodiment of the present invention, there is provided a zoom lens system including at least a first lens group GR1 having a positive refractive power, a second lens group GR2 having a negative refractive power, a third lens group GR3 having a positive refractive power, a fourth lens group GR4 having a negative refractive power, a fifth lens group GR5 having a positive refractive power, and a sixth lens group GR6 having a negative refractive power, arranged sequentially from the object side, zoom ratio being varied by changing the distance between the adjacent lens groups, the distance, taken as DW(i-j), between the i- and j-th lens groups at the wide angle end during at-infinity imaging and that, taken as DT(i-j), between the i- and j-th lens groups at the telephoto end during at-infinity imaging meeting the following conditions (1), (2), (3), (4) and (5)

$$DW(1-2) < DT(1-2) \tag{1}$$

$$DW(2-3) > DT(2-3) \tag{2}$$

$$DW(3-4) > DT(3-4) \tag{3}$$

$$DW(4-5) < DT(4-5) \tag{4}$$

$$DW(5-6) < DT(5-6) \tag{5, and}$$

focusing being made by moving the fourth lens group GR4 axially of the lenses.

Also, according to another embodiment of the present invention, there is provided an imaging device including a zoom lens system including a plurality of lens groups and in which the zoom ratio is varied by changing the distance between the adjacent lens groups and image sensing devices to convert an optical image formed by the zoom lens system into an electrical signal, the zoom lens system including at least a first lens group GR1 having a positive refractive power, a second lens group GR2 having a negative refractive power, a third lens group GR3 having a positive refractive power, a fourth lens group GR4 having a negative refractive power, a fifth lens group GR5 having a positive refractive power, and a sixth lens group GR6 having a negative refractive power, arranged sequentially from the object side, zoom ratio being varied by changing the distance between the adjacent lens groups, the distance, taken as DW(i-j), between the i- and j-th lens groups at the wide angle end during at-infinity imaging and that, taken as DT(i-j), between the i- and j-th lens groups at the telephoto end during at-infinity imaging meeting the following conditions (1), (2), (3), (4) and (5)

$$DW(1-2) < DT(1-2) \tag{1}$$

$$DW(2-3) > DT(2-3) \tag{2}$$

$$DW(3-4) > DT(3-4) \tag{3}$$

$$DW(4-5) < DT(4-5) \tag{4}$$

$$DW(5-6) < DT(5-6) \tag{5, and}$$

focusing being made by moving the fourth lens group GR4 axially of the lenses.

In the above zoom lens system according to the present invention, there are arranged at least the six lens groups, or positive, negative, positive, negative, positive and negative, and the distance between the adjacent lens groups is changed during variation of the zoom ratio, whereby it is possible to provide a compact, high-powered zoom lens system that can attain a high magnification with movement of the whole lens system over a relatively short distance. Also, movement of the fourth lens group GR4 as a focusing group permits to attain focusing with a smaller range of movement than that in the related art in which the first or second lens group has to be moved for focusing, so that the driving mechanism can be designed more compact and also a higher-speed AF (autofocusing) can be possible. Further, the negative lens group is disposed as the last lens group to scale up an image at once, whereby it is possible to reduce the shortest lens-to-subject distance and assure a high performance of imaging without dependence upon any object distance.

Also the imaging device employing the above zoom lens system according to the present invention can be designed more compact since the zoom lens system itself can be designed compact and is capable of the high-speed autofocusing (AF). Thus, the imaging device is more user-friendly, can cover a wider range of imaging function from wide angle to telephoto and can assure a higher image quality without depending upon any object distance.

The foregoing and other features, aspects and advantages of the present invention will become apparent from the following detailed description of embodiments of the present invention when taken in conjunction with the accompanying drawings.

BEST MODE FOR CARRYING OUT THE INVENTION

Figure 1:
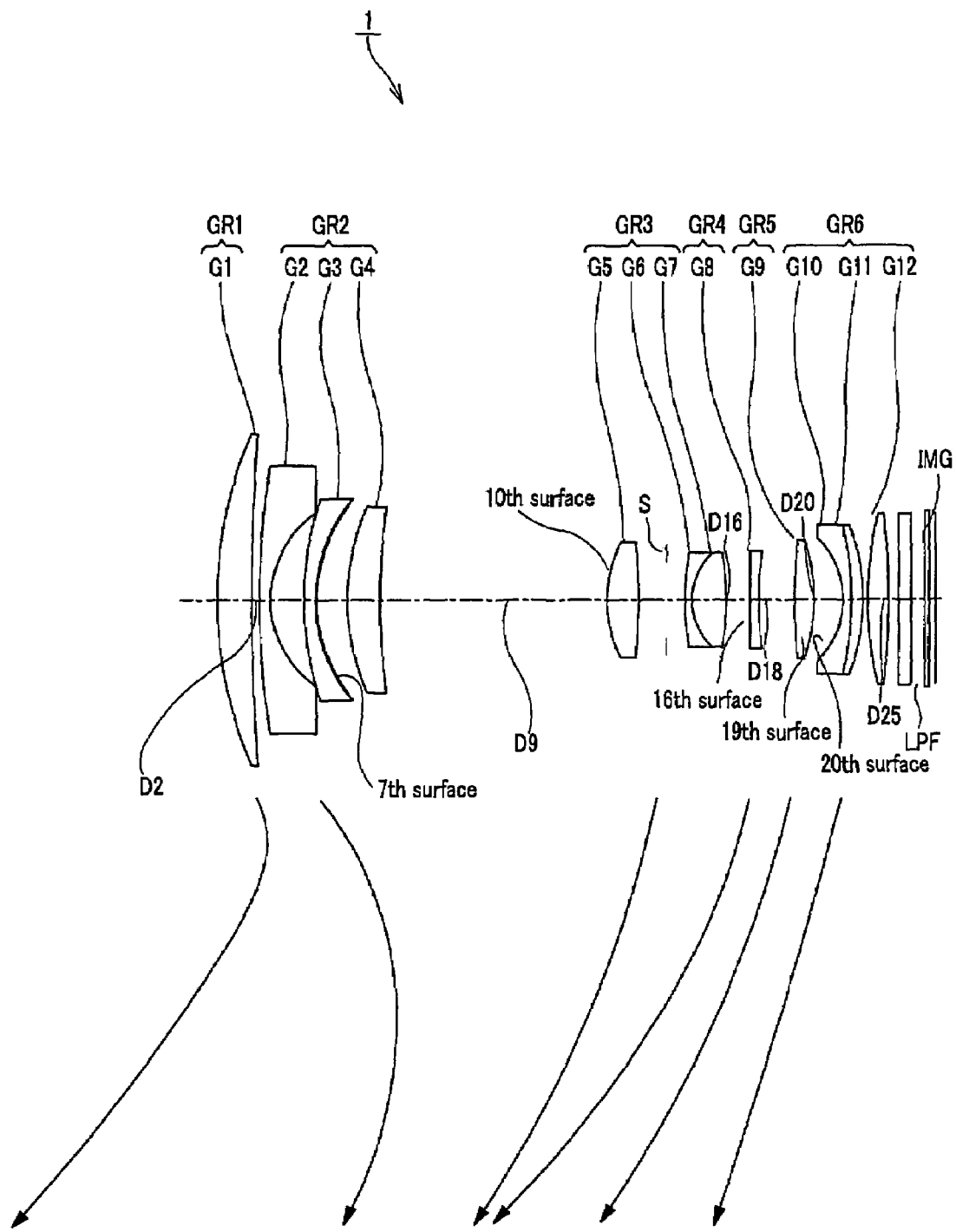
FIG. 1 schematically illustrates the configuration of a zoom lens system as a first embodiment of the present invention.

The present invention will be described in detail below concerning embodiments of the zoom lens system according to the present invention and an embodiment of the imaging device using the zoom lens system with reference to the accompanying drawings.

Also, the zoom lens system according to the present invention includes at least a first lens group GR1 having a positive refractive power, a second lens group GR2 having a negative refractive power, a third lens group GR3 having a positive refractive power, a fourth lens group GR4 having a negative refractive power, a fifth lens group GR5 having a positive refractive power, and a sixth lens group GR6 having a negative refractive power, arranged sequentially from the object side. Zoom ratio is varied by changing each distance between the adjacent lens groups. The distance, taken as DW(i-j), between the i- and j-th lens groups at the wide angle end during at-infinity imaging and that, taken as DT(i-j), between the i- and j-th lens groups at the telephoto end during at-infinity imaging meet the following conditions (1), (2), (3), (4) and (5)

$$DW(1\text{-}2) < DT(1\text{-}2) \tag{1}$$

$$DW(2\text{-}3) > DT(2\text{-}3) \tag{2}$$

$$DW(3\text{-}4) > DT(3\text{-}4) \tag{3}$$

$$DW(4\text{-}5) < DT(4\text{-}5) \tag{4}$$

$$DW(5\text{-}6) < DT(5\text{-}6) \tag{5, and}$$

focusing is made by moving the fourth lens group GR4 axially of the lenses.

The above zoom lens system is formed from at least the six lens groups, or positive, negative, positive, negative, positive and negative, and the distance between the adjacent lens groups is changed during variation of the zoom ratio. Thus, there can be provided a compact, high-powered zoom lens system that can attain a high magnification with movement of the whole lens system over a relatively short distance. Also, movement of the fourth lens group GR4 as a focusing group permits to attain focusing with a smaller range of movement than that in the related art in which the first or second lens group has to be moved for focusing, so that the driving mechanism can be designed more compact and also a higher-speed AF (auto-focusing) can be possible. Further, the negative lens group is disposed as the last lens group to scale up an image at once, whereby it is possible to reduce the shortest lens-to-subject distance and assure a high performance of imaging without dependence upon any object distance.

The conditional expression (1) defines a distance between the first and second lens groups GR1 and GR2 for varying the zoom ratio in a direction from the wide angle to telephoto end. The conditional expression (2) defines a distance between the second and third lens groups GR2 and GR3 for varying the zoom ratio in the direction from the wide angle to telephoto end. Meeting these conditions (1) and (2) permits a large variation in zoom ratio from the wide angle to telephoto end.

The conditional expression (3) defines a distance between the third lens group GR3 and the fourth lens group GR4 as a focusing group for varying the zoom ratio in the direction from the wide angle to telephoto end. The conditional expression (4) defines a distance between the focusing group (fourth lens group) GR4 and fifth lens group GR5 for varying the zoom ratio in the direction from the wide angle to telephoto end. Meeting these conditions (3) and (4) permits to suppress the field-curvature fluctuation as well as to well correct the fluctuation of spherical aberration caused by a variation of the lens-to-subject distance by generating a field-curvature fluctuation in the opposite direction by changing the axial spacing of the focusing group (fourth lens group) GR4 to cancel out the field-curvature fluctuation.

The conditional expression (5) defines a between the fifth and sixth lens groups GR5 and GR6 for varying the zoom ratio in the direction from the wide angle to telephoto end. Meeting this condition permits to well make corrections for various aberrations and vary the zoom ratio.

The focusing group (fourth lens group) GR4 is formed from a single concave lens, and a focal length, taken as fg4, of the fourth lens group GR4, that, taken as fw, at the wide angle end of the whole lens system, refractive index, taken as Ndg4, along the d line of the fourth lens group GR4 and Abbe constant, taken as Vdg4, along the d line of the fourth lens group GR4 should desirably meet the following conditions (6), (7) and (8).

$$1.5 < |fg4/fw| < 3.5 \quad (6)$$

$$1.8 < Ndg4 \quad (7)$$

$$25 < Vdg4 \quad (8)$$

Since the focusing group (fourth lens group). GR4 is formed from the single concave lens, it is lighter, whereby the driving mechanism can be designed more compact and also the AF speed can be improved.

The conditional expression (6) defines a ratio between the focal length of the focusing group (fourth lens group) GR4 having a negative refractive power and that at the wide angle end of the whole lens system. If the value of |fg4/fw| is smaller than 1.5, the negative refractive power of the focus group will be too strong so that an excessive field-curvature will occur during close-up shop at the wide angle end, resulting in a larger performance degradation as well as in a larger fluctuation of image surface, which are not desirable for the AF control. Also, if the value of |fg4/fw| is larger than 3.5, the negative refractive power of the focusing group will be too weak so that the movable range of the focusing group will be larger and the whole lens system cannot be designed compact.

The conditional expression (7) defines a refractive index of the focusing group (fourth lens group) GR4 having the negative refractive power. If the value of Ndg4 is smaller than 1.8, the field-curvature and spherical aberration will take place in larger amount, for which no easy corrections can be made even in the whole lens system.

The conditional expression (8) defines a generated amount of chromatic aberration of the focusing group (fourth lens group) GR4 having the negative refractive power. If the value of Vdg4 is larger than 25, the chromatic aberration will take place in larger amount during close-up shot and corrections cannot easily be made therefor even in the whole lens system.

When the zoom ratio is to be varied, the third and fifth lens groups GR3 and GR5 should be moved together axially of the lenses. Thus, the third and fifth lens groups GR3 and GR5 may be formed from a single cam cylinder in such a manner that the focusing group (fourth lens group) GR4 is movable, which will contribute to an easier mechanical construction as well as to an easier relative positioning of the third, fourth and fifth lens groups GR3, GR4 and GR5 for which a strict manufacturing tolerance is apt to be required.

A back focal length (equivalent air conversion table), taken as Twbf, at the wide angle end and focal length, taken as fw, at the wide angle end of the whole lens system should desirably meet the following condition (9).

$$0.2 < Twbf/fw < 1.2 \quad (9)$$

The conditional expression (9) defines a ratio between BF (back focal length) at the wide angle end and that of the whole lens system at the wide angle end. If the value of Twbf/fw is smaller than 0.2, LPF (low-pass filter) and IR (infrared cutting) glass will be extremely near the surface of the image sensing device so that dust on LPF and IR glass and defect of them will be conspicuous. Also, if the value is larger than 1.2, the front one of the lenses will be larger in diameter so that it will be difficult to design the lens system more compact as well as to make a wider-angle imaging lens system. Especially, the value of Twbf/fw should more desirably be within a range between 0.3 and 0.8.

The sixth lens group GR6 includes at least one concave lens having a negative refractive power and one convex lens having a positive refractive power, arranged in this order from the side of an object. A lateral magnification, taken as βtg6, at the telephoto end of the sixth lens group GR6 should desirably meet the following condition (10).

$$1.1 < βtg6 < 2.0 \quad (10)$$

Forming the sixth lens group GR6 from at least one concave lens having the negative refractive power and one convex lens having the positive refractive power, arranged in this order from the object side permits to reflect marginal rays upward by the concave lens while suppressing the marginal rays by the convex lens, whereby the room range can easily be widened while suppressing the distortion aberration and also the angle of incidence of the marginal rays upon the image sensing device can be lessened. Also, effective corrections can be made for the magnification and chromatic aberration.

The conditional expression (10) defines a lateral magnification of the sixth lens group GR6 in a telescope. Since the six lens group GR6 can scale up image at once, the whole lens system can be designed compact. Since the sixth lens group GR6 has a high power, a close-up shot is allowed irrespectively of the large image sensing device and thus imaging can be made over a shortest close-up distance. If the value of βtg6 is smaller than 1.1, the magnification by the sixth lens group GR6 will be lower so that the whole lens system will be difficult to design compact and also the shortest close-up distance be increased. Also, if the value of βtg6 is larger than 2.0, it will be more difficult to assemble the lenses together with a high accuracy, which is not desirable in manufacture of the zoom lens system.

At least one side of each lens included in the fifth lens group GR5 should desirably be aspheric. As having been described above, various aberrations including the spherical aberration taking place when the lens-to-subject distance varies are corrected by moving the focusing group (fourth lens group) GR4 axially of the lenses. With at least one side of each lens included in the fifth lens group GR5 being formed aspheric, it is possible to make effective corrections for various aberrations taking place when the lens-to-subject distance varies and those taking place when the magnification is changed, simultaneously.

For varying the zoom ratio from the wide angle to telephoto side, the first lens group GR1 should desirably be moved once to the image surface side and then to the object side. Thus, the whole lens length can be kept short in the whole range of zoom ratio variation from the wide angle to telephoto side, thereby permitting to assure a high optical performance of the zoom lens system.

For varying the zoom ratio from the wide angle to telephoto, the distance between the fourth lens group GR4 to fifth lens group GR5 should desirably be decreased from the wide angle end to the intermediate focal length and then increased from the intermediate focal length to telephoto end, and the distance, taken as DT(4-5), between the fourth and fifth lens groups GR4 and GR5 and focal length, taken as fg4, of the fourth lens group GR4 meet the following condition (11).

$$3 < |fg4/DT(4-5)| < 6 \tag{11}$$

In the above-mentioned embodiment of the zoom lens system, the focusing group (fourth lens group) GR4 is disposed between the third and fifth lens groups GR3 and GR5 to make corrections for aberrations during zoom ratio variation and focusing. Especially, with the distance between the fourth and fifth lens groups GR4 and GR5 being changed as above, it is possible to have even a large image sensing device be focused at a close-up point while maintaining the high performance of imaging by suppressing the aberration fluctuation over the zoom focusing range.

The conditional expression (11) defines a ratio, at the telephoto end, between the movable range and focal length of the focusing group GR4 (fourth lens group). If the value of |fg4/DT(4-5)| is smaller than 3, the fourth lens group GR4 will have a lower power and DT(4-5) (movable range of the focusing group) be larger; so that the focusing block will undesirably be larger. On the other hand, if the value of |fg4/DT(4-5)| is larger than 6, the fourth lens group GR4 will have a higher power and the aberration fluctuation during close-up shot will undesirably be larger.

At least one side of each lens included in the second lens group GR2 should desirably be aspheric. Thus, effective corrections can be made for distortion and coma aberrations at the wide angle end, whereby it is possible to assure an improved compactness and higher performance.

At least one side of each lens included in the sixth lens group GR6 should desirably be aspheric. Thus, effective corrections can be made for field curvature and coma aberration at the peripheral region.

For suppressing the chromatic aberration during close-up shot, the concave lens included in the focusing group (fourth lens group) GR4 may be formed from two more lenses joined to each other.

Three embodiments of the zoom lens system according to the present invention will be described in detail below with reference to FIGS. 1 to 12 and Tables 1 to 11.

It should be noted that each of the embodiments uses aspheric lenses and the aspheric shape is given by the following expression (1).

$$x = \frac{y^2 \cdot c^2}{1 + (1 - (1+K) \cdot y^2 \cdot c^2)^{1/2}} + \sum A^i \cdot y^i \tag{1}$$

where y is height in a direction perpendicular to the lens axis, x is a lens-axial distance from both lens apexes, c is a paraxial curvature at the lens apex, K is a conic constant and $A^i$ is a primary aspheric surface constant.

FIG. 1 shows the lens configuration of a zoom lens system as a first embodiment of the present invention. As shown, the zoom lens system includes a first lens group GR1 having a positive refractive power, second lens group GR2 having a negative refractive power, third lens group GR3 having a positive refractive power, fourth lens group GR4 having a negative refractive power, fifth lens group GR5 having a positive refractive power and sixth lens group GR6 having a negative refractive power, arranged sequentially from the object side. For varying the zoom ratio from the wide angle to telephoto side, each of the lens groups is moved axially of the lenses as indicated with a solid arrow. The first lens group GR1 is formed from a convex lens G1. The second lens group GR2 is a combination of a concave lens G2, concave lens G3 having a composite aspheric surface at the object side, and a convex lens G4. The third lens group GR3 is a combination of a convex lens G5 having a composite aspheric surface at the object side, iris S and a doublet formed from a concave lens G6 and a convex lens G7 having an aspheric surface at the object side. The fourth lens group GR4 is formed from a concave lens G8. The fifth lens group GR5 is a convex lens G9 which is aspheric at both sides thereof. The sixth lens group GR6 is a combination of a double formed from a concave lens G10 and convex lens G11 and a convex lens G12.

In the above first embodiment and second and third embodiments which will be described later, a parallel, planar low-pass filter (LPF) is provided between the last lens and imaging surface IMG of the zoom lens system. It should be noted that the low-pass filter (LPF) may be a double-refraction low-pass filter formed from a crystal of which a predetermined axial direction has been adjusted or the like, a phase type low-pass filter in which a required optical cut-off frequency response is attained under the effect of diffraction or the like.

Table 1 shows a first example in which various data are given to the first embodiment. Of various data in the first example and examples which will be described later, f is a focal length, FNo is an F number, ω is a half angle of view, R is a radius of curvature, D is an inter-lens group distance, Nd is a refractive index for the d line (λ=587.6 nm) and Vd is an Abbe constant for the d line. Also, "ASP" indicates an aspheric surface, and "INFINITY" in the R (radius of curvature) field indicates a flat surface.

TABLE 1

| Surface No. | R | | D | Nd | Vd |
|---|---|---|---|---|---|
| 1 | 66.358 | | 5.185 | 1.5891 | 61.253 |
| 2 | 381.552 | | variable | | |
| 3 | 160.929 | | 1.700 | 1.7725 | 49.600 |
| 4 | 17.445 | | 6.091 | | |
| 5 | 60.914 | | 1.700 | 1.7725 | 49.600 |
| 6 | 22.708 | | 0.200 | 1.5361 | 41.207 |
| 7 | 17.943 | ASP | 4.984 | | |
| 8 | 33.443 | | 5.000 | 1.9229 | 20.880 |
| 9 | 76.538 | | variable | | |
| 10 | 20.244 | ASP | 0.200 | 1.5146 | 49.961 |
| 11 | 23.005 | | 4.555 | 1.6180 | 63.396 |
| 12 | −113.994 | | 4.441 | | |
| Iris | INFINITY | | 3.000 | | |
| 14 | 28.726 | | 1.200 | 1.9037 | 31.319 |
| 15 | 10.704 | | 5.500 | 1.6230 | 58.122 |
| 16 | −52.125 | ASP | Variable | | |
| 17 | −1000.000 | | 1.000 | 1.9037 | 31.319 |
| 18 | 32.312 | | Variable | | |
| 19 | 70.952 | ASP | 2.525 | 1.5831 | 59.461 |
| 20 | −45.105 | ASP | Variable | | |
| 21 | −13.563 | | 1.200 | 1.8350 | 42.984 |
| 22 | −55.331 | | 1.839 | 1.8467 | 23.785 |
| 23 | −32.446 | | 1.000 | | |
| 24 | 61.394 | | 2.916 | 1.9229 | 20.880 |
| 25 | −154.436 | | Variable | | |
| 26 | INFINITY | | 2.010 | 1.5523 | 63.424 |
| 27 | INFINITY | | 2.100 | | |
| 28 | INFINITY | | 0.500 | 1.5567 | 58.649 |
| 29 | INFINITY | | 1.000 | | |

As the lens position is shifted from the wide angle to telephoto end, a distance D2 between the first and second lens groups GR1 and GR2, distance D9 between the second and third lens groups GR2 and GR3, distance D16 between the third and fourth lens groups GR3 and GR4, distance D18 between the fourth and fifth groups GR4 and GR5, distance D20 between the fifth and sixth lens group GR5 and GR6 and distance D25 between the sixth lens group GR6 and low-pass filter LPF will vary.

Table 2 shows an inter-lens distance at each of wide angle end, intermediate focal length between the wide angle and telephoto ends and telephoto end along with a focal length f, F number Fno., and half angle of view ω.

TABLE 2

| f | 14.71 | 32.0597 | 69.8725 |
|---|---|---|---|
| Fno. | 2.8501 | 3.7238 | 5.0545 |
| ω | 42.6615 | 21.9117 | 10.5638 |
| D2 | 1.000 | 21.214 | 43.456 |
| D9 | 36.851 | 13.343 | 1.366 |
| D16 | 3.937 | 4.579 | 2.544 |
| D18 | 6.037 | 5.394 | 7.430 |
| D20 | 4.829 | 7.977 | 15.086 |
| D25 | 2.000 | 9.935 | 21.801 |

The seventh, tenth, sixteenth, nineteenth and twelfth lens surfaces are formed aspheric and the aspheric coefficients are as shown in Table 3. It should be noted that in Table 3 and tables showing aspheric coefficients and which will appear later, "E−i" represents an index whose base is 10, that is, it represents "$10^{-i}$". For example, "0.12345E−05" represents "$0.12345 \times 10^{-5}$".

TABLE 3

| Surface No. | K | $A^4$ | $A^6$ | $A^8$ | $A^{10}$ |
|---|---|---|---|---|---|
| 7 | −1.092E−01 | −2.822E−05 | −6.366E−08 | 6.44E−11 | −7.54E−13 |
| 10 | 0.000E+00 | −2.071E−05 | −2.457E−08 | −3.06E−10 | 2.03E−12 |
| 16 | 2.549E−01 | 3.840E−06 | −2.542E−08 | −2.74E−09 | 2.67E−11 |
| 19 | 0.000E+00 | 2.296E−05 | −4.800E−07 | 9.29E−09 | −1.23E−10 |
| 20 | 0.000E+00 | 6.366E−06 | −6.296E−07 | 1.12E−08 | −1.35E−10 |

Figure 2:
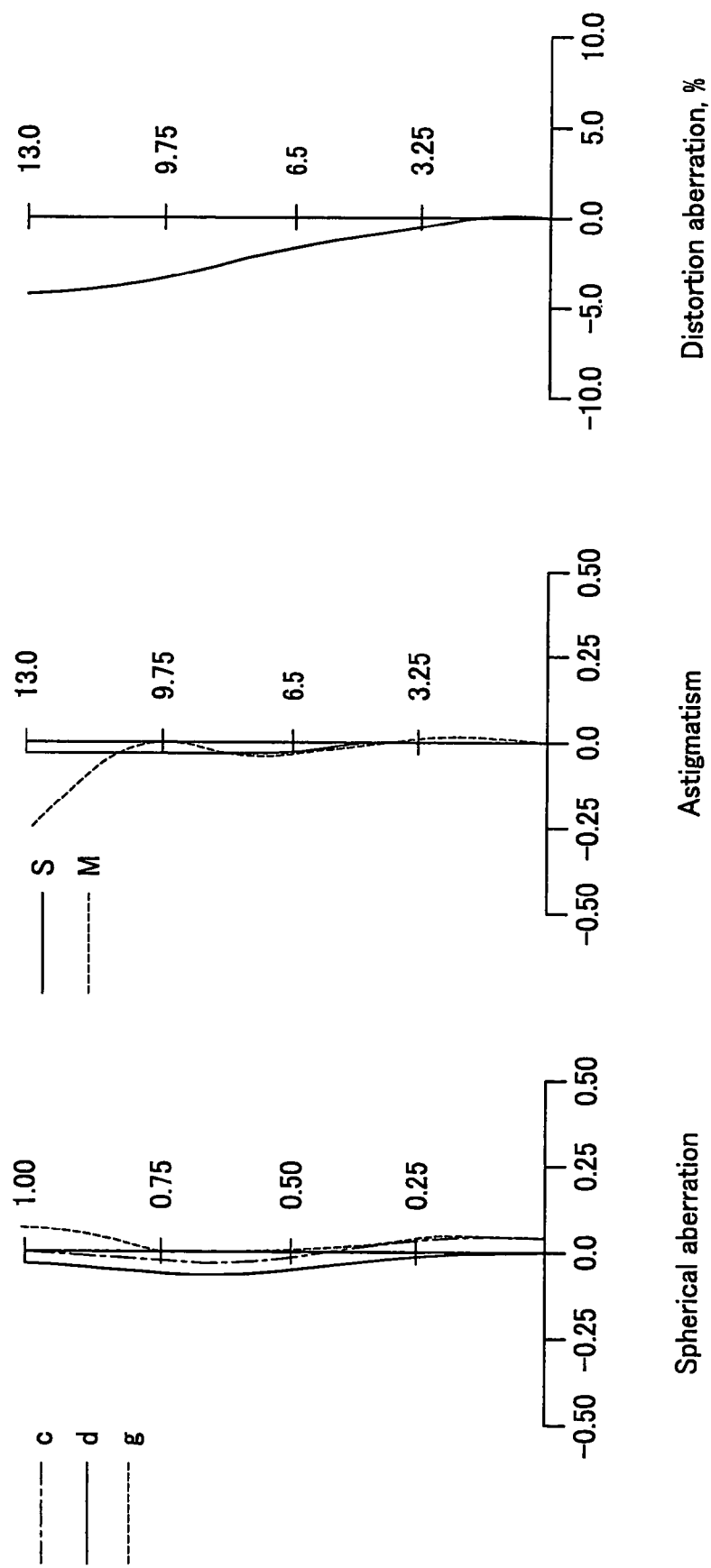
FIG. 2 graphically illustrates various aberrations including spherical aberration, astigmatism and distortion aberration at the wide angle end in the zoom lens system as the first embodiment of the present invention.
Figure 3:
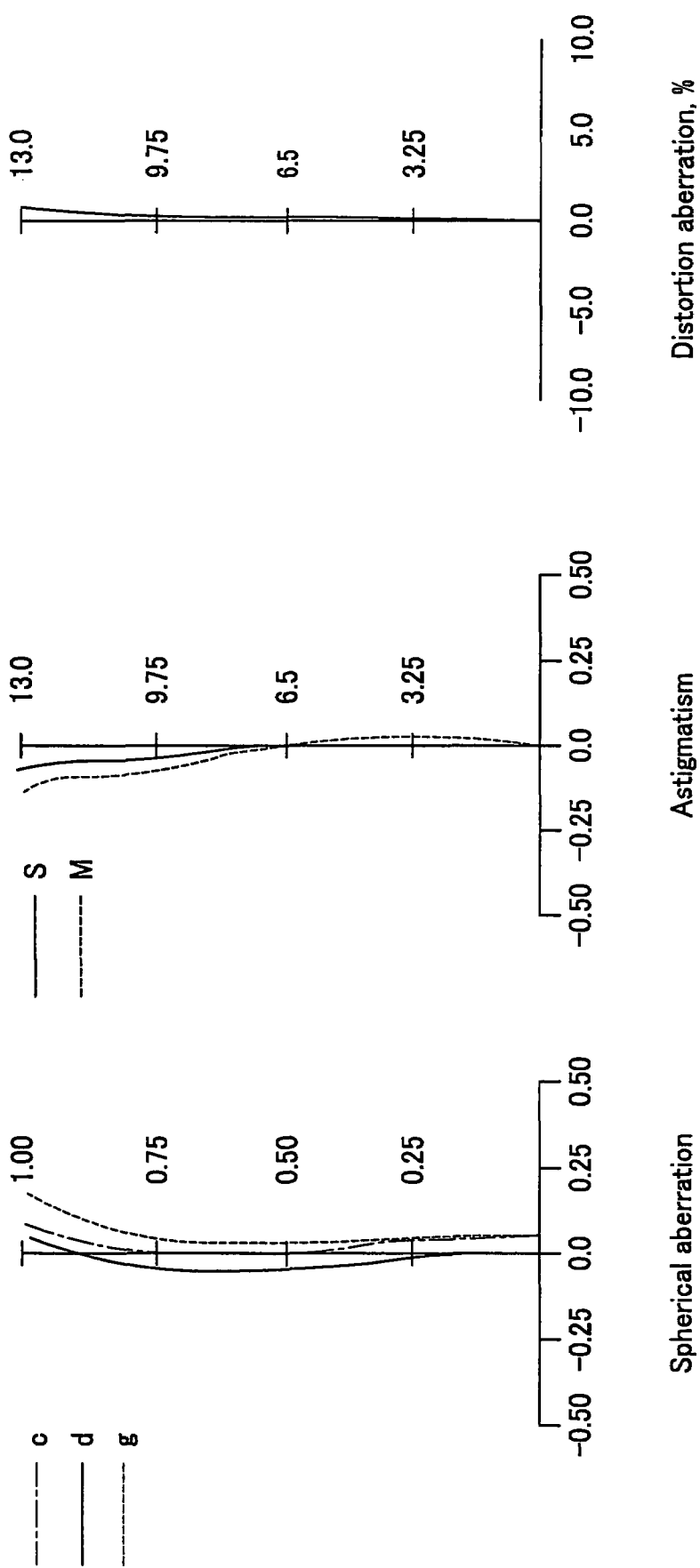
FIG. 3 shows a spherical aberration, astigmatism and distortion aberration at the intermediate focal length in the zoom lens system as the first embodiment of the present invention.
Figure 4:
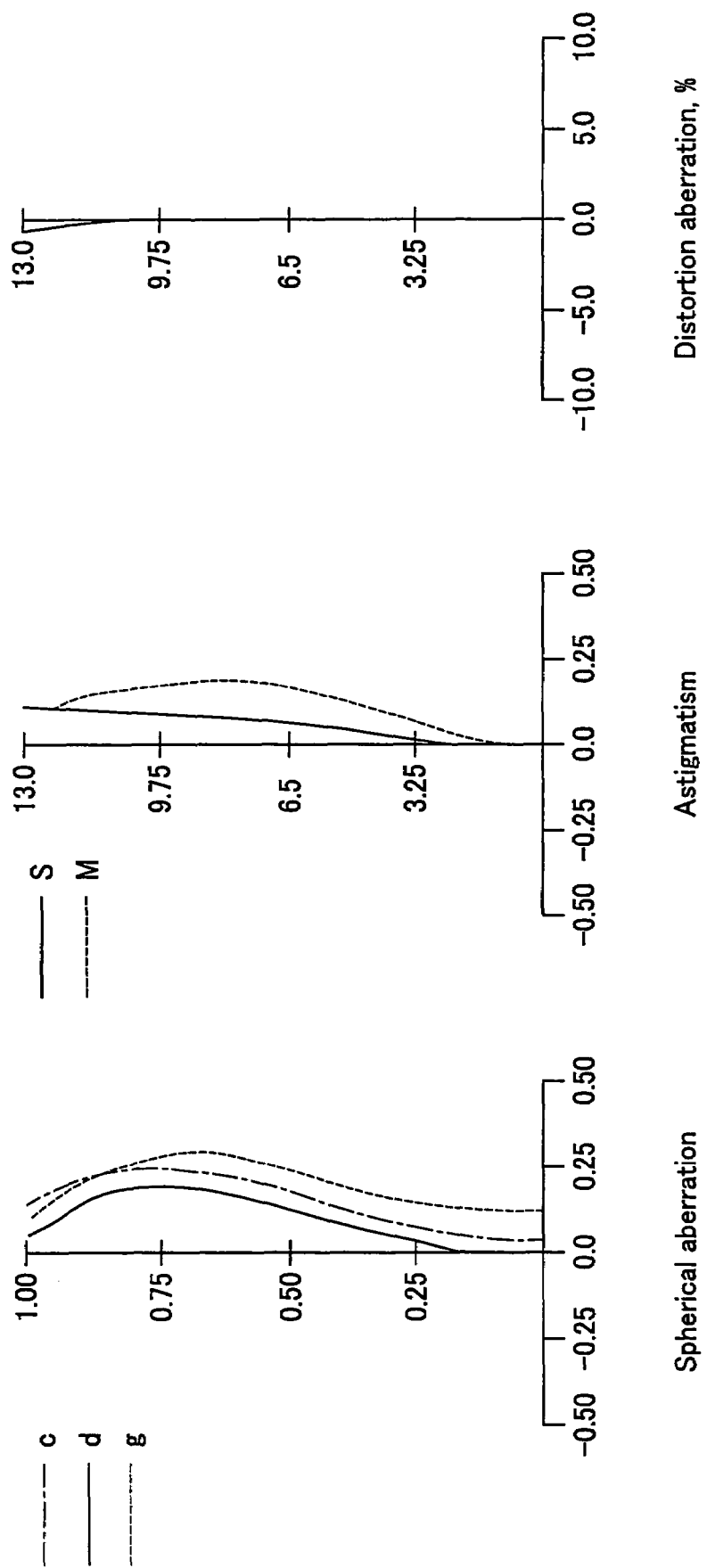
FIG. 4 shows a spherical aberration, astigmatism and distortion aberration at the telephoto end the zoom lens system as the first embodiment of the present invention.

FIGS. 2 to 4 show various aberrations when the first example is in the state of at-infinity focusing. FIG. 2 shows an aberration when the focal length f at the wide angle end is 14.71, FIG. 3 shows an aberration when the intermediate focal length f between the wide angle and telephoto ends is 32.0597, and FIG. 4 shows an aberration when the focal length f at the telephoto end is 69.8725.

In the spherical aberrations shown in FIGS. 2 to 4, the vertical axis indicates a ratio to an open F value, horizontal axis indicates defocusing, solid line indicates a d line, broken line indicates a C line and dotted line indicates a g line. In the aspheric aberrations, the vertical axis indicates an image height, horizontal line indicates focusing, solid line indicates a sagittal image surface and broken line indicates a meridional image surface. In the distortion aberrations, the vertical axis indicates an image height and horizontal axis indicates a distortion aberration ratio.

In the above first example, the conditions (1) to (11) are met as will be described later with reference to Tables 10 and 11. Also, as shown in FIGS. 2 to 4, each of the aberrations is corrected in a good balance at the wide angle end, intermediate focal length between the wide angle and telephoto ends and at the telephoto end.

Figure 5:
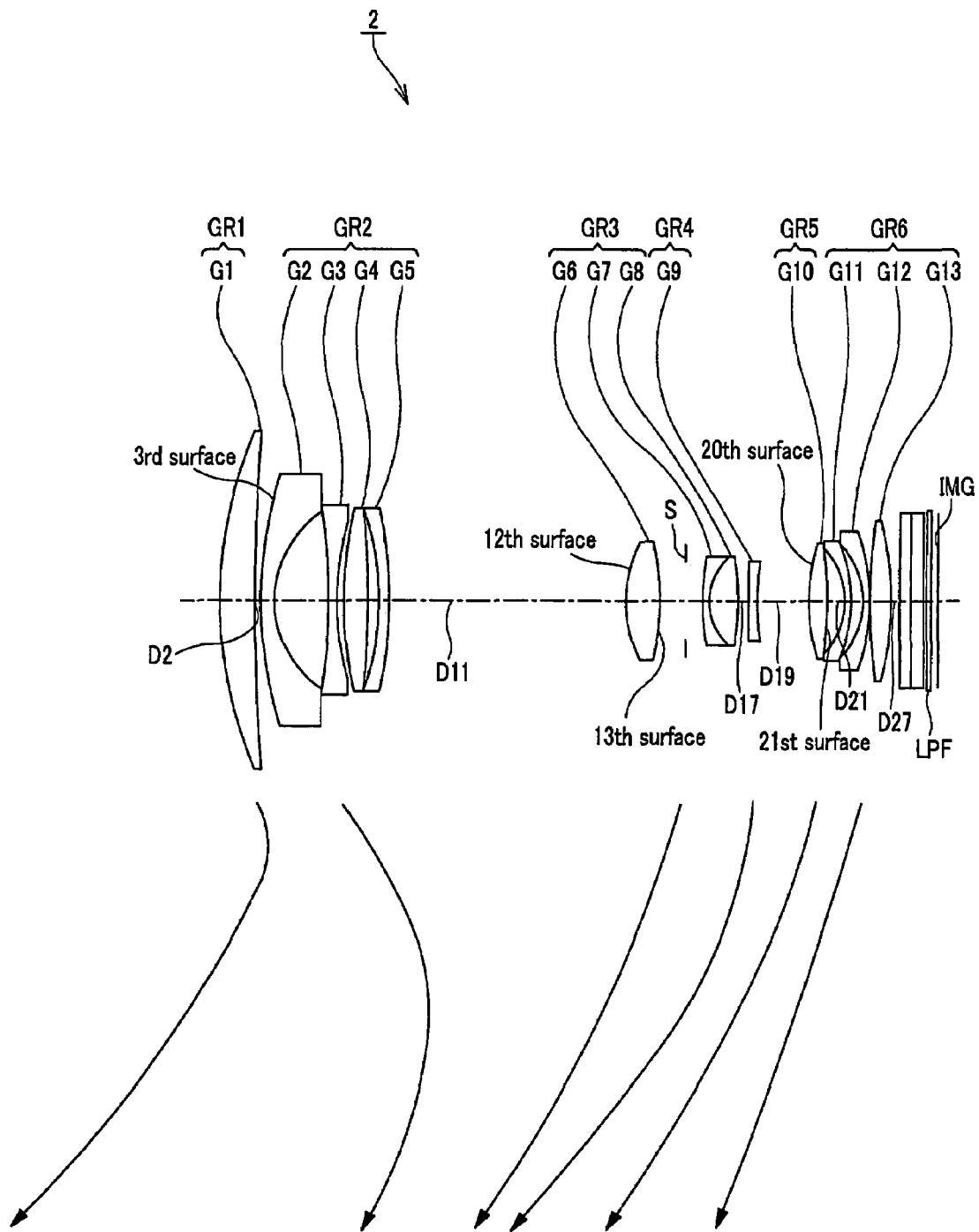
FIG. 5 shows the lens configuration of a zoom lens system as a second embodiment of the present invention.

FIG. 5 shows the lens configuration of a zoom lens system as a second embodiment of the present invention. As shown, the zoom lens system includes a first lens group GR1 having a positive refractive power, second lens group GR2 having a negative refractive power, third lens group GR3 having a positive refractive power, fourth lens group GR4 having a negative refractive power, fifth lens group GR5 having a positive refractive power and sixth lens group GR6 having a negative refractive power, arranged sequentially from the object side. The first lens group GR1 is formed from a convex lens G1. The second lens group GR2 is a combination of a concave lens G2 having a composite aspheric surface at the object side, concave lens G3, convex lens G4 and a concave lens G5. The third lens group GR3 is a combination of a convex lens G6 which is aspheric at either side thereof, iris S and a doublet formed from a concave lens G7 and a convex lens G8. The fourth lens group GR4 is formed from a concave lens G9. The fifth lens group GR5 is a convex lens G10 which is aspheric at either side thereof. The sixth lens group GR6 is a combination of a double formed from a concave lens G11, concave lens G12 and a convex lens G13.

Table 4 shows a second example in which concrete numerical values data are given to the second embodiment.

TABLE 4

| Surface No. | R | | D | Nd | Vd |
|---|---|---|---|---|---|
| 1 | 61.208 | | 5.749 | 1.4970 | 81.608 |
| 2 | 453.103 | | variable | | |
| 3 | 109.374 | ASP | 0.200 | 1.5361 | 41.207 |

TABLE 4-continued

| Surface No. | R | | D | Nd | Vd |
|---|---|---|---|---|---|
| 4 | 71.011 | | 1.500 | 1.8830 | 40.805 |
| 5 | 16.719 | | 8.717 | | |
| 6 | −84.775 | | 1.300 | 1.8350 | 42.984 |
| 7 | 62.847 | | 1.306 | | |
| 8 | 61.963 | | 3.697 | 1.9229 | 20.880 |
| 9 | −82.497 | | 2.021 | | |
| 10 | −31.659 | | 1.218 | 1.8350 | 42.984 |
| 11 | −52.883 | | variable | | |
| 12 | 19.011 | ASP | 4.917 | 1.6325 | 63.756 |
| 13 | −53.964 | ASP | 4.155 | | |
| Iris | INFINITY | | 3.000 | | |
| 15 | 53.249 | | 0.900 | 1.9037 | 31.312 |
| 16 | 11.333 | | 4.643 | 1.6180 | 63.396 |
| 17 | −47.031 | | variable | | |
| 18 | −567.820 | | 1.000 | 1.8830 | 40.805 |
| 19 | 41.637 | | variable | | |
| 20 | 82.577 | ASP | 2.400 | 1.5831 | 59.461 |
| 21 | −42.774 | ASP | variable | | |
| 22 | −15.375 | | 1.100 | 1.8350 | 42.984 |
| 23 | −24.965 | | 1.800 | | |
| 24 | −14.073 | | 1.200 | 1.6968 | 55.460 |
| 25 | −27.569 | | 0.649 | | |
| 26 | 200.000 | | 2.804 | 1.9229 | 20.880 |

TABLE 4-continued

| Surface No. | R | D | Nd | Vd |
|---|---|---|---|---|
| 27 | −47.868 | variable | | |
| 28 | INFINITY | 2.820 | 1.5168 | 64.198 |
| 29 | INFINITY | 1.000 | | |
| 30 | INFINITY | 0.500 | 1.5567 | 58.649 |
| 31 | INFINITY | 1.000 | | |

As the lens position is shifted from the wide angle to telephoto end, a distance D2 between the first and second lens groups GR1 and GR2, distance D11 between the second and third lens groups GR2 and GR3, distance D17 between the third and fourth lens groups GR3 and GR4, distance D19 between the fourth and fifth groups GR4 and GR5, distance D21 between the fifth and sixth lens group GR5 and GR6 and distance D27 between the sixth lens group GR6 and low-pass filter LPF will vary. Table 5 shows an inter-lens distance at each wide angle end, intermediate focal length between the wide angle and telephoto ends and at the telephoto end along with a focal length f, F number Fno., and half angle of view ω.

TABLE 5

| | | | |
|---|---|---|---|
| f | 14.700 | 35.4023 | 85.2599 |
| Fno. | 2.868 | 3.8592 | 5.4993 |
| ω | 42.347 | 19.6293 | 8.5166 |
| D2 | 1.000 | 25.960 | 51.460 |
| D11 | 38.369 | 12.991 | 1.000 |
| D17 | 2.100 | 4.647 | 1.800 |
| D19 | 8.635 | 6.088 | 8.935 |
| D21 | 2.800 | 4.942 | 12.179 |
| D27 | 2.000 | 10.934 | 24.530 |

The third, twelfth, thirteenth, twentieth and twenty-first lens surfaces are formed aspheric and the aspheric coefficients are as shown in Table 6.

TABLE 6

| Surface No. | K | $A^4$ | $A^6$ | $A^8$ | $A^{10}$ |
|---|---|---|---|---|---|
| 3 | 0.000E+00 | 1.130E−05 | −1.859E−08 | 3.18E−11 | −3.11E−14 |
| 12 | 3.501E−01 | −2.478E−05 | −4.58E−08 | 2.23E−10 | −1.66E−12 |
| 13 | 0.000E+00 | 1.432E−06 | −5.922E−08 | 9.97E−10 | −5.31E−12 |
| 20 | 0.000E+00 | 4.486E−05 | 3.29E−08 | 7.83E−09 | 5.14E−11 |
| 21 | 2.150E−02 | 2.479E−05 | 1.07E−07 | 2.58E−09 | 1.20E−10 |

Figure 6:
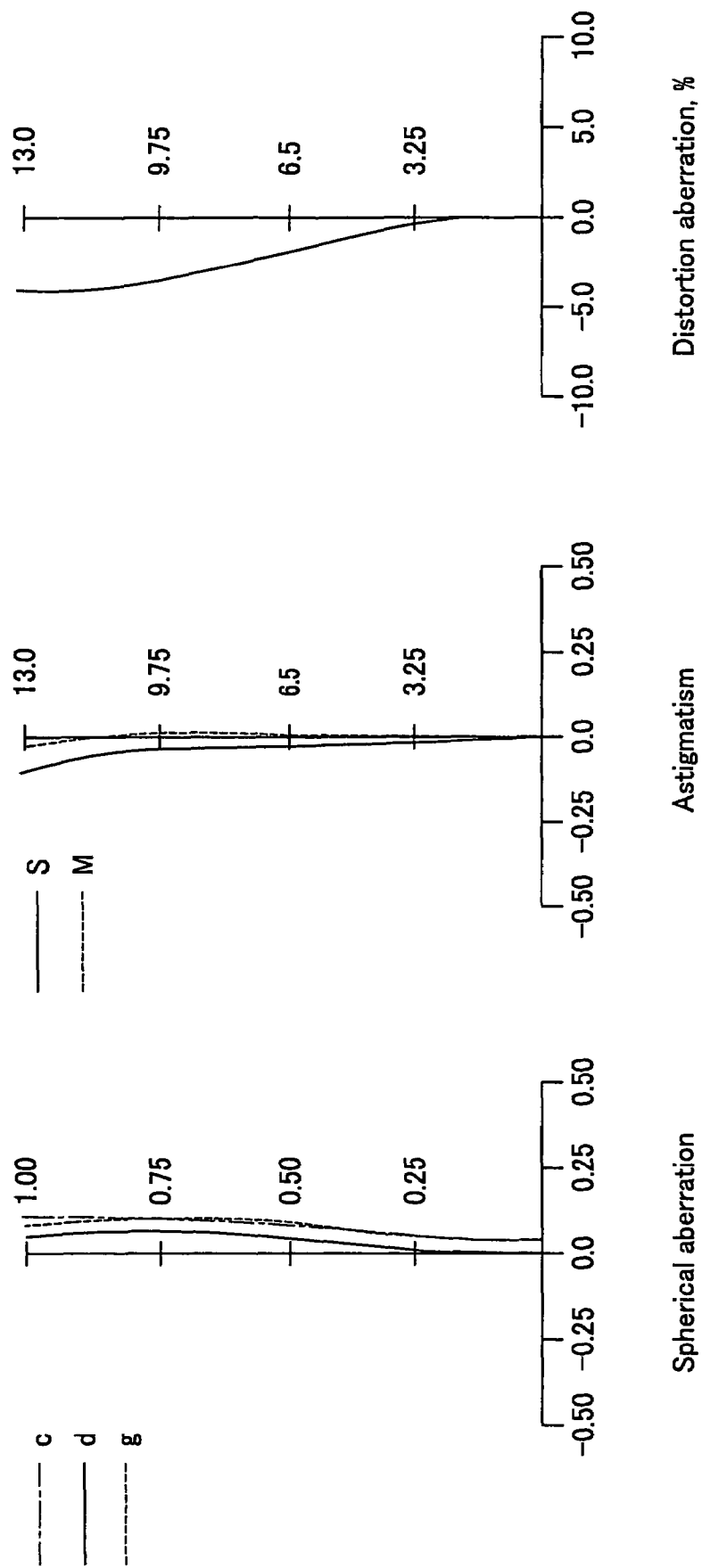
FIG. 6 graphically illustrates various aberrations including spherical aberration, astigmatism and distortion aberration at the wide angle end in the zoom lens system as the second embodiment of the present invention.
Figure 7:
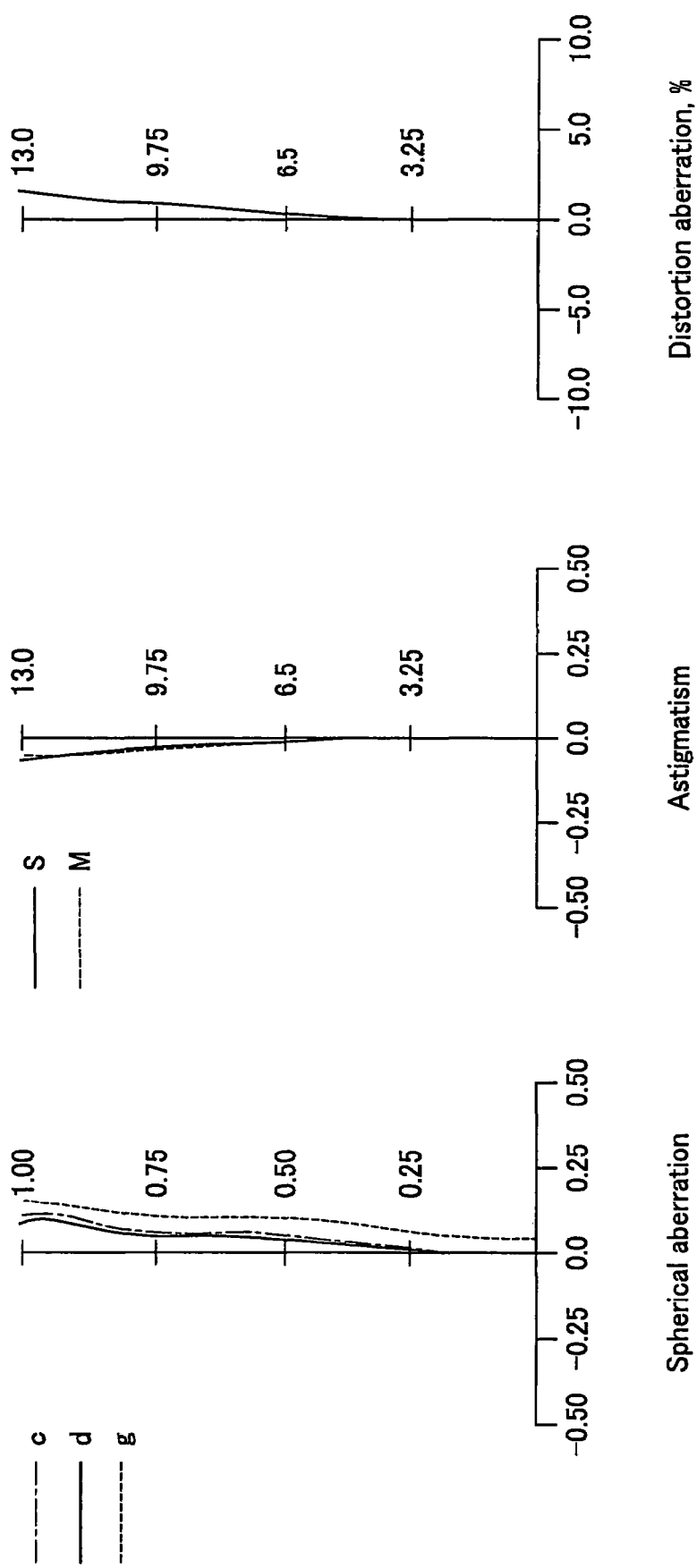
FIG. 7 shows a spherical aberration, astigmatism and distortion aberration at the intermediate focal length in the zoom lens system as the second embodiment of the present invention.
Figure 8:
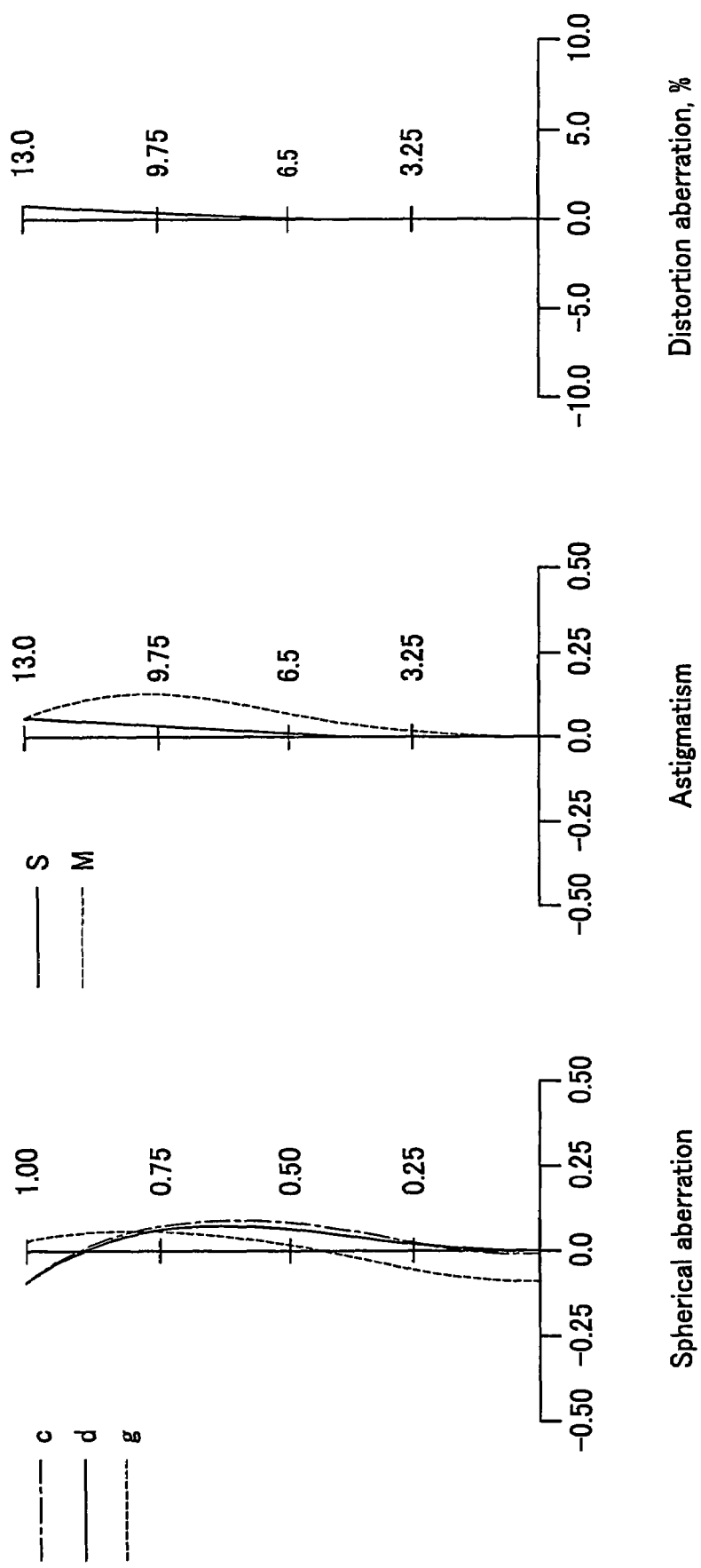
FIG. 8 shows a spherical aberration, astigmatism and distortion aberration at the telephoto end in the zoom lens system as the second embodiment of the present invention.

FIGS. 6 to 8 show various aberrations when the second example is in the state of at-infinity focusing. FIG. 6 shows an aberration when the focal length f at the wide angle end is 14.700, FIG. 7 shows an aberration when the intermediate focal length f between the wide angle and telephoto ends is 35.4023, and FIG. 8 shows an aberration when the focal length f at the telephoto end is 85.2599.

In the spherical aberrations shown in FIGS. 6 to 8, the vertical axis indicates a ratio to an open F value, horizontal axis indicates defocusing, solid line indicates a d line, broken line indicates a C line and dotted line indicates a g line. In the aspheric aberrations, the vertical axis indicates an image height, horizontal line indicates focusing, solid line indicates a sagittal image surface and broken line indicates a meridional image surface. In the distortion aberrations, the vertical axis indicates an image height and horizontal axis indicates a distortion aberration ratio.

In the above second example, the conditions (1) to (11) are met as will be described later with reference to Tables 10 and 11. Also, as shown in FIGS. 6 to 8, each of the aberrations is corrected in a good balance at the wide angle end, intermediate focal length between the wide angle and telephoto ends and at the telephoto end.

Figure 9:
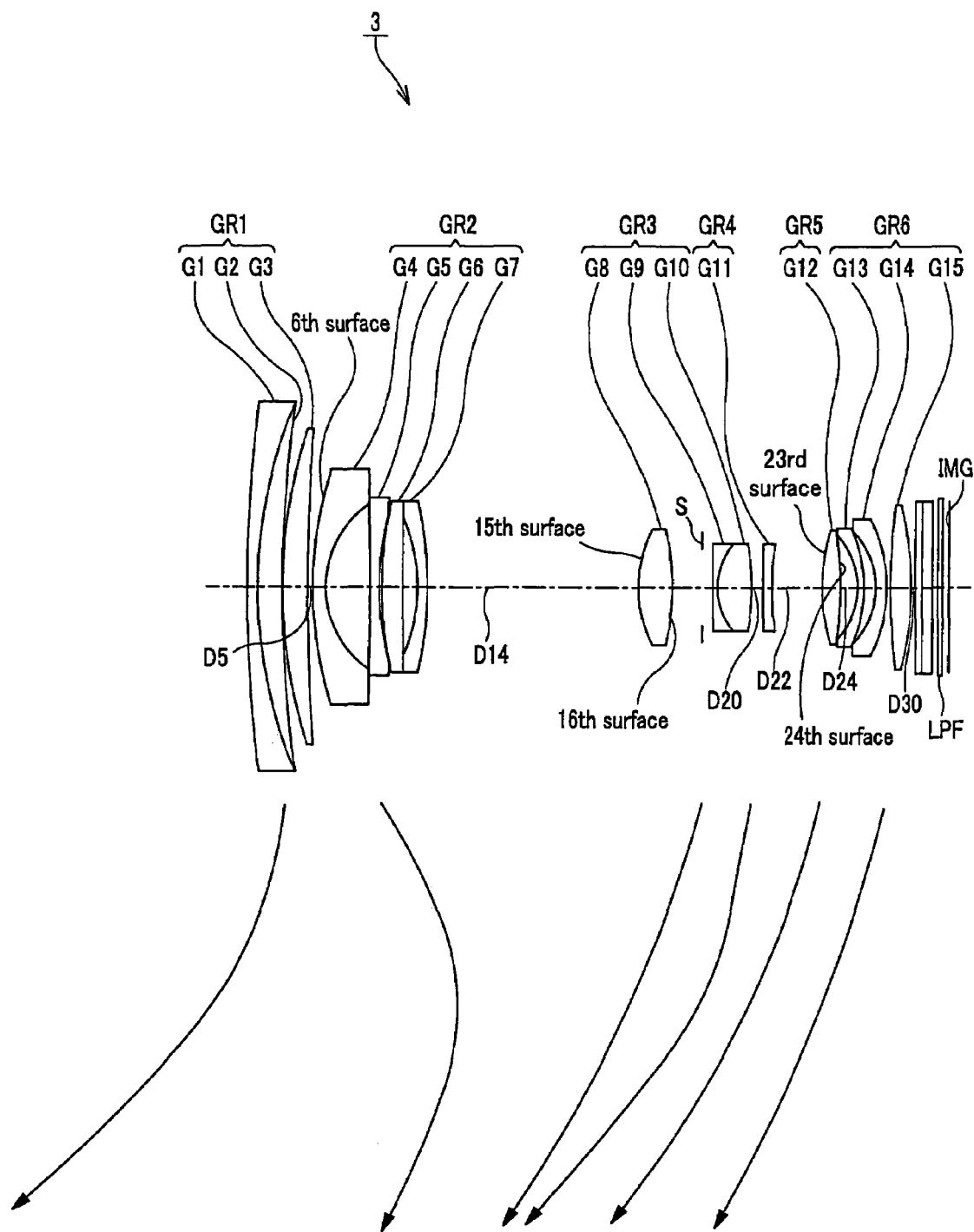
FIG. 9 shows the lens configuration of a zoom lens system as a third embodiment of the present invention.

FIG. 9 shows the lens configuration of a zoom lens system as a third embodiment of the present invention. As shown, the zoom lens system includes a first lens group GR1 having a positive refractive power, second lens group GR2 having a negative refractive power, third lens group GR3 having a positive refractive power, fourth lens group GR4 having a negative refractive power, fifth lens group GR5 having a positive refractive power and sixth lens group GR6 having a negative refractive power, arranged sequentially from the object side. The first lens group GR1 is a combination of a doublet formed from a concave lens G1 and convex lens G2 and a convex lens G3. The second lens group GR2 is a combination of a concave lens G4 having a composite aspheric surface at the object side, concave lens G5, convex lens G6 and a concave lens G7. The third lens group GR3 is a combination of a convex lens G8 which is aspheric at either side thereof, iris S and a doublet formed from a concave lens G9 and a convex lens G10. The fourth lens group GR4 is formed from a concave lens G11. The fifth lens group GR5 is a convex lens G12 which is aspheric at either side thereof. The sixth lens group GR6 is a combination of a concave lens G13, concave lens G14 and a convex lens G15.

Table 7 shows a third example in which concrete numerical values data are given to the third embodiment.

TABLE 7

| Surface No. | R | | D | Nd | Vd |
|---|---|---|---|---|---|
| 1 | 183.226 | | 1.500 | 1.6477 | 33.841 |
| 2 | 72.384 | | 4.000 | 1.6230 | 58.122 |
| 3 | 172.155 | | 0.200 | | |

TABLE 7-continued

| Surface No. | R | | D | Nd | Vd |
|---|---|---|---|---|---|
| 4 | 69.943 | | 4.092 | 1.7725 | 49.624 |
| 5 | 298.241 | | variable | | |
| 6 | 95.817 | ASP | 0.200 | 1.5361 | 41.207 |
| 7 | 69.272 | | 1.500 | 1.8830 | 40.805 |
| 8 | 15.456 | | 7.474 | | |
| 9 | −97.927 | | 1.300 | 1.7725 | 49.624 |
| 10 | 40.837 | | 0.630 | | |
| 11 | 39.617 | | 3.186 | 1.9229 | 20.880 |
| 12 | −304.336 | | 2.793 | | |
| 13 | −25.835 | | 1.279 | 1.8350 | 42.984 |
| 14 | −34.463 | | variable | | |
| 15 | 19.823 | ASP | 5.000 | 1.6180 | 63.396 |
| 16 | −42.552 | ASP | 5.000 | | |
| Iris | INFINITY | | 1.580 | | |
| 18 | 60.961 | | 0.900 | 1.9037 | 0.313 |
| 19 | 12.616 | | 5.500 | 1.6180 | 63.396 |
| 20 | −32.237 | | variable | | |

TABLE 7-continued

| Surface No. | R | | D | Nd | Vd |
|---|---|---|---|---|---|
| 21 | −323.526 | | 1.000 | 1.8830 | 40.805 |
| 22 | 32.230 | | variable | | |
| 23 | 64.803 | ASP | 3.007 | 1.5831 | 59.461 |
| 24 | −30.077 | ASP | variable | | |
| 25 | −15.089 | | 1.100 | 1.8350 | 42.984 |
| 26 | −33.111 | | 2.904 | | |
| 27 | −13.200 | | 1.200 | 1.5209 | 64.097 |
| 28 | −23.078 | | 0.814 | | |
| 29 | 200.000 | | 2.785 | 1.9229 | 20.880 |
| 30 | −52.191 | | variable | | |
| 31 | INFINITY | | 2.820 | 1.5168 | 64.198 |
| 32 | INFINITY | | 1.000 | | |
| 33 | INFINITY | | 0.500 | 1.5567 | 58.649 |
| 34 | INFINITY | | 1.000 | | |

As the lens position is shifted from the wide angle to telephoto end, a distance D5 between the first and second lens groups GR1 and GR2, distance D14 between the second and third lens groups GR2 and GR3, distance D20 between the third and fourth lens groups GR3 and GR4, distance D22 between the fourth and fifth groups GR4 and GR5, distance D24 between the fifth and sixth lens group GR5 and GR6 and distance D30 between the sixth lens group GR6 and low-pass filter LPF will vary. Table 8 shows an inter-lens distance at each wide angle end, intermediate focal length between the wide angle and telephoto ends and telephoto end along with a focal length f, F number Fno., and half angle of view $\omega$.

TABLE 8

| f | 14.700 | 35.087 | 83.7453 |
|---|---|---|---|
| Fno. | 2.853 | 3.810 | 5.3334 |
| $\omega$ | 42.439 | 19.754 | 8.6818 |
| D5 | 1.000 | 23.940 | 47.327 |
| D14 | 33.950 | 11.434 | 1.000 |
| D20 | 2.621 | 4.514 | 1.800 |
| D22 | 7.380 | 4.516 | 7.580 |
| D24 | 2.560 | 4.355 | 9.304 |
| D30 | 1.000 | 11.035 | 26.501 |

The sixth, fifteenth, sixteenth, twenty-third and twenty-fourth lens surfaces are formed aspheric and the aspheric coefficients are as shown in Table 9.

TABLE 9

| Surface No. | K | $A^4$ | $A^6$ | $A^8$ | $A^{10}$ |
|---|---|---|---|---|---|
| 6 | 0.000E+00 | 1.077E−05 | −1.930E−08 | 3.357E−11 | −3.97E−14 |
| 15 | 3.501E−01 | −2.607E−05 | −9.334E−08 | 9.69E−10 | −6.26E−12 |
| 16 | 0.000E+00 | 1.816E−05 | −8.468E−08 | 1.16E−09 | −6.83E−12 |
| 23 | 0.000E+00 | 2.098E−05 | −1.184E−07 | 3.90E−09 | 1.03E−11 |
| 24 | 2.150E−02 | 8.062E−07 | −1.977E−07 | 3.68E−09 | 1.66E−11 |

Figure 10:
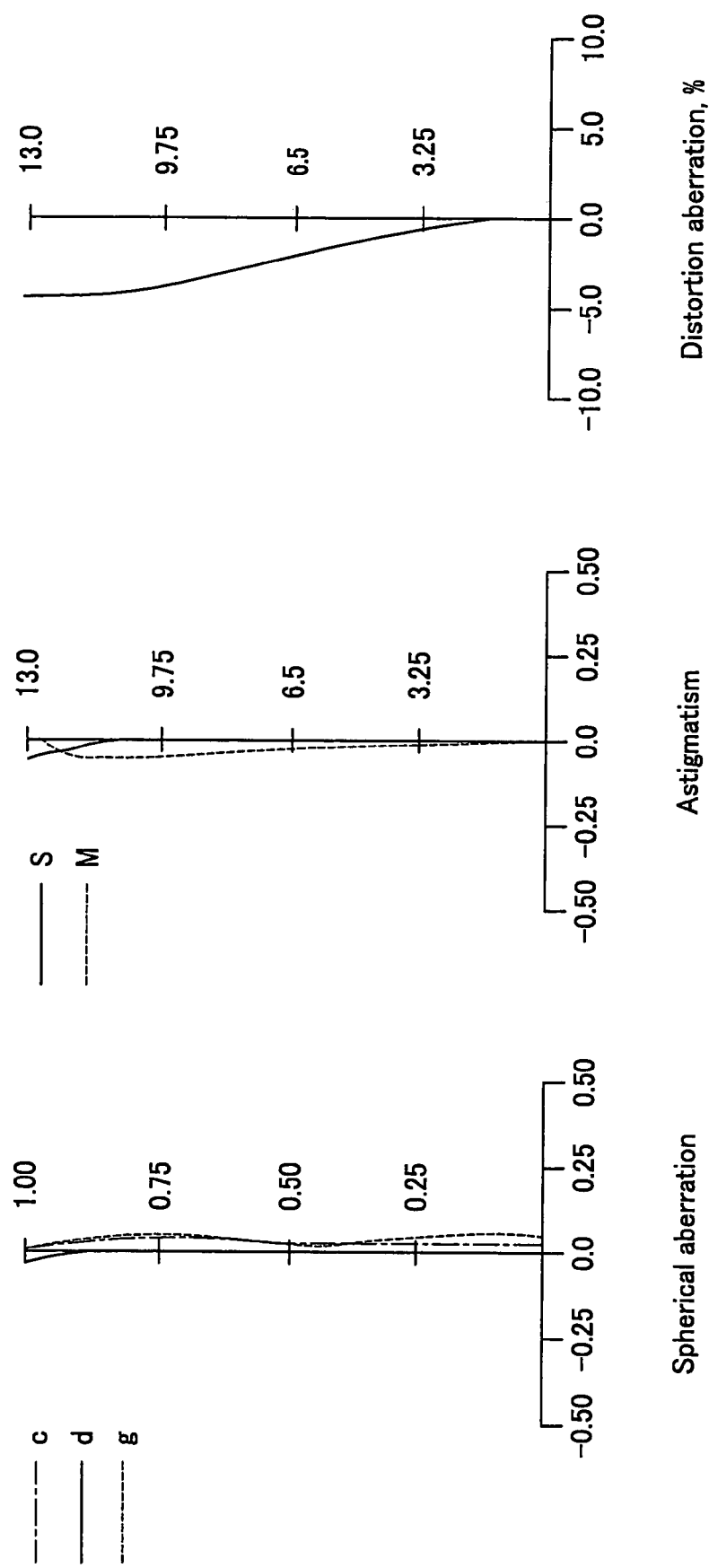
FIG. 10 graphically illustrates various aberrations including spherical aberration, astigmatism and distortion aberration at the wide angle end in the zoom lens system as the third embodiment of the present invention.
Figure 11:
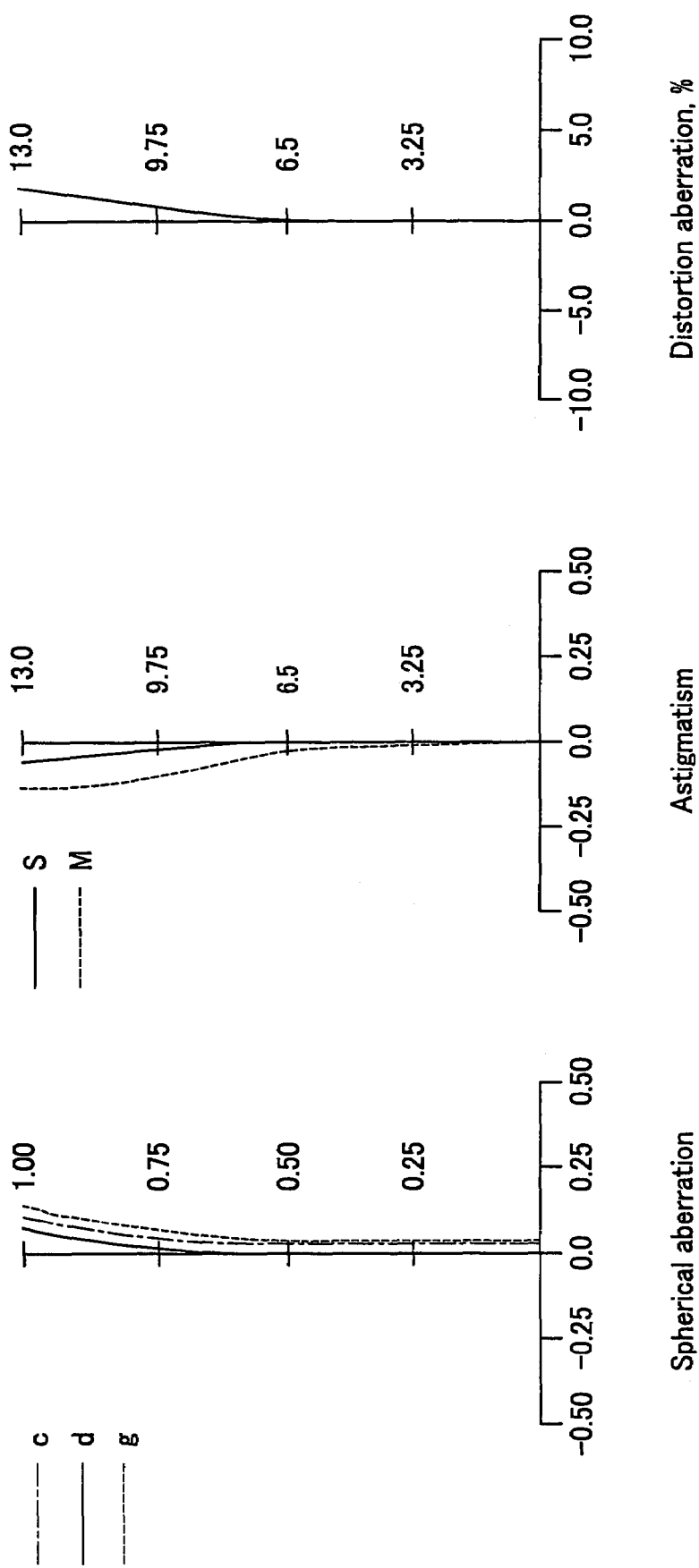
FIG. 11 shows a spherical aberration, astigmatism and distortion aberration at the intermediate focal length in the zoom lens system third embodiment of the present invention.
Figure 12:
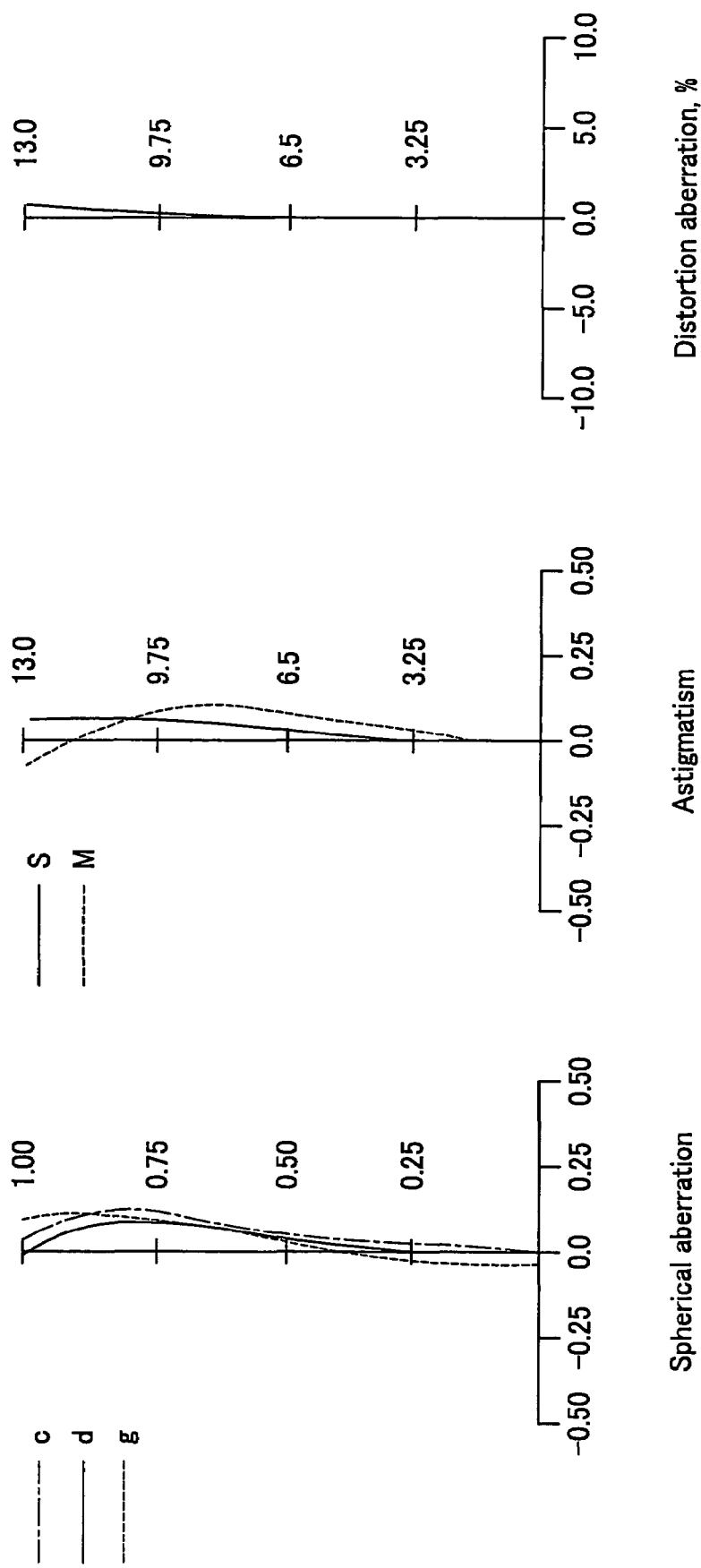
FIG. 12 shows a spherical aberration, astigmatism and distortion aberration at the telephoto end in the zoom lens system as the third embodiment of the present invention.

FIGS. 10 to 12 show various aberrations when the third example is in the state of at-infinity focusing. FIG. 10 shows an aberration when the focal length f at the wide angle end is 14.700, FIG. 11 shows an aberration when the intermediate focal length f between the wide angle and telephoto ends is 35.087, and FIG. 12 shows an aberration when the focal length f at the telephoto end is 83.7453.

In the spherical aberrations shown in FIGS. 10 to 12, the vertical axis indicates a ratio to an open F value, horizontal axis indicates defocusing, solid line indicates a d line, broken line indicates a C line and dotted line indicates a g line. In the aspheric aberrations, the vertical axis indicates an image height, horizontal line indicates focusing, solid line indicates a sagittal image surface and broken line indicates a meridional image surface. In the distortion aberrations, the vertical axis indicates an image height and horizontal axis indicates a distortion aberration ratio.

In the above third example, the conditions (1) to (11) are met as will be described later with reference to Tables 10 and 11. Also, as shown in FIGS. 10 to 12, each of the aberrations is corrected in a good balance at the wide angle end, intermediate focal length between the wide angle and telephoto ends and at the telephoto end.

Corresponding values in the conditional expressions (1) to (5) for the aforementioned first to third examples are shown in Table 10, and those in the conditional expressions (6) to (11) are shown in Table 11.

TABLE 10

| Expression (1) | DW (1-2) | DT (1-2) |
|---|---|---|
| 1 | 1.000 | 43.456 |
| 2 | 1.000 | 51.460 |
| 3 | 1.000 | 47.327 |
| Expression (2) | DW (2-3) | DT (2-3) |
| 1 | 36.851 | 1.366 |
| 2 | 38.369 | 1.000 |
| 3 | 33.950 | 1.000 |
| Expression (3) | DW (3-4) | DT (3-4) |
| 1 | 3.937 | 2.544 |
| 2 | 2.100 | 1.800 |
| 3 | 2.621 | 1.800 |
| Expression (4) | DW (4-5) | DT (4-5) |
| 1 | 6.037 | 7.430 |
| 2 | 8.635 | 8.935 |
| 3 | 7.380 | 7.580 |
| Expression (5) | DW (5-6) | DT (5-6) |
| 1 | 4.829 | 15.086 |
| 2 | 2.800 | 12.179 |
| 3 | 2.560 | 9.304 |

TABLE 11

| Examples of given numerical values | $\|fg4/Tw\|$ | Ndg4 | Vdg4 | Twbf/fw | βtg6 | $\|fg4/DT (4-5)\|$ |
|---|---|---|---|---|---|---|
| 1 | 2.336 | 1.904 | 31.319 | 0.457 | 1.394 | 4.625 |
| 2 | 2.969 | 1.883 | 40.805 | 0.420 | 1.656 | 4.885 |
| 3 | 2.242 | 1.883 | 40.805 | 0.352 | 1.844 | 4.348 |

It should be noted that each lens group in the aforementioned embodiments of the zoom lens system according to the present invention is formed from only refraction lenses that deflect incident light by refracting (that is, lenses of such a type that deflect the light a the boundary between media different in refractive index from each other), to which the present invention is not limited. For example, the lens group may be formed from diffraction lenses that deflect incident light by diffraction, refraction/diffraction-hybrid lenses that deflect incident light by a combination of diffraction and refraction, refractive index-distributed lenses that deflect incident light under the action of a refractive index distribution in the media or the like.

Also, a surface having no optical power (for example, reflective surface, refractive surface or diffraction surface) may be disposed in the light path to bend the light path before and after, or in the middle of, the zoom lens system. The bending points may be set appropriately. By bending the light path appropriately, the apparent thickness of the lens can be reduced.

According to the present invention, an image can also be shifted by shifting one lens group or more of the lens groups included in the lens system or a part of one lens group nearly perpendicularly to the lens axis. A combination of a detection system to detect a camera movement, drive system to shift the lens groups and a control system to shift the drive system according to an output from the detection system can provide a vibration-free optical system.

More particularly, according to the present invention, a part or all of the third, fourth and fifth lens groups can be shifted perpendicularly to the lens axis to shift an image with less fluctuation of aberration. Since the third lens group is disposed near the iris, off-axis light beam passes by near the lens axis so that coma aberration taking place when the lens groups are shifted will fluctuate less.

Figure 13:
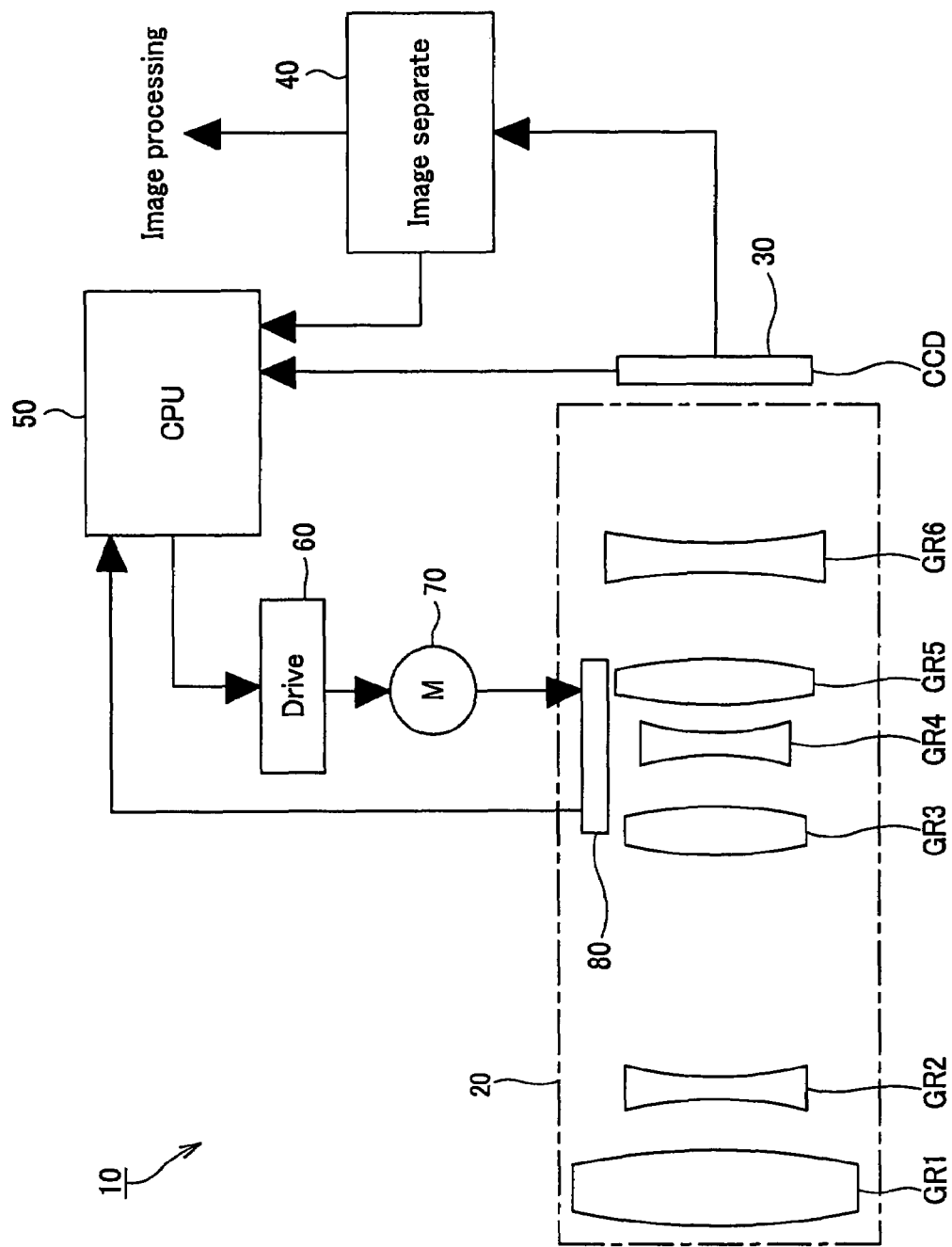
FIG. 13 shows the configuration of an imaging device adopting the zoom lens system, as another embodiment of the present invention.

FIG. 13 shows the configuration of an imaging device adopting the zoom lens system, as another embodiment of the present invention.

As shown in FIG. 13, the imaging device, generally indicated with a reference numeral 10, includes a zoom lens 20 and an image sensing device 30 that converts an optical image formed by the zoom lens 20 into an electrical signal. It should be noted that the image sensing device 30 may use, for example, a CCD (charge-coupled device), CMOS (complementary metal-oxide semiconductor) or the like. The zoom lens system according to the present invention may be used as the zoom lens. Each lens group included in the zoom lens system 1 as the first embodiment of the present invention, as shown in FIG. 1 is shown being simplified as a single lens in FIG. 13. Of course, the zoom lens system 2 or 3 as the second or third embodiment of the present invention, having previously been illustrated and described, may also be used as the zoom lens 20.

An electrical signal produced by the above image sensing device 30 is sent to an image separation circuit 40, a focus control signal is sent to a control circuit 50, and an image signal is sent to an image processing circuit. The signal sent to the image processing circuit is processed into a form suitable for subsequent steps of processing for display on a display apparatus, recording to a recording medium, transfer by a communications means, etc.

The control circuit 50 is supplied with external control signals from the focus ring, focus switch and the like and allows various operations in response to such control signals. For example, when the control circuit 50 is supplied with a focus command from the focus switch, it will activate a drive unit 70 via a driver circuit 60 to move the fourth lens group GR4 to a predetermined position for a focal length corresponding to the focus command. Information on the position, detected by each sensor 80, of the fourth lens group GR4 is supplied to the control circuit 50 and referred to when providing a command signal to the drive circuit 60. Also, when in the AF mode, the control circuit 50 checks the state of focusing on the basis of a signal sent to the image separation circuit 40, and controls the fourth lens group GR4, for example, by means of the driver circuit 60 for an optimum focusing.

The above-mentioned imaging device 10 may be produced in various forms as practical products. For example, the imaging device 10 can widely be applied as a camera unit in a digital input/output device such as a digital still camera, digital video camera, mobile phone with a camera, PDA (Personal Digital Assistant) with a camera, etc.

It should be noted that concrete shapes and numeral values of the components, specified in the description of the embodiments and examples, are given herein just as example ones intended for implementation of the present invention, by which the technical scope of the present invention will not be limited.

The invention claimed is:

1. A zoom lens system comprising at least:
a first lens group GR1 having a positive refractive power;
a second lens group GR2 having a negative refractive power;
a third lens group GR3 having a positive refractive power;
a fourth lens group GR4 having a negative refractive power;
a fifth lens group GR5 having a positive refractive power; and
a sixth lens group GR6 having a negative refractive power, arranged sequentially from the object side,
zoom ratio being varied by changing the distance between the adjacent lens groups,
the distance, taken as DW(i-j), between the i- and j-th lens groups at the wide angle end during at-infinity imaging and that, taken as DT(i-j), between the i- and j-th lens groups at the telephoto end during at-infinity imaging meeting the following conditions (1), (2), (3), (4) and (5)

$$DW(1-2)<DT(1-2) \tag{1}$$

$$DW(2-3)>DT(2-3) \tag{2}$$

$$DW(3-4)>DT(3-4) \tag{3}$$

$$DW(4-5)<DT(4-5) \tag{4}$$

$$DW(5-6)<DT(5-6) \tag{5, and}$$

focusing being made by moving the fourth lens group GR4 axially of the lenses.

2. The zoom lens system according to claim 1, wherein the fourth lens group GR4 is formed from a single concave lens, and
a focal length, taken as fg4, of the fourth lens group GR4, that, taken as fw, at the wide angle end of the whole lens system, refractive index, taken as Ndg4, along the d line of the fourth lens group GR4 and Abbe constant, taken as Vdg4, along the d line of the fourth lens group GR4 meet the following conditions (6), (7) and (8), $$1.5<|fg4/fw|<3.5 \tag{6}$$

$$1.8<Ndg4 \tag{7}$$

$$25<Vdg4 \tag{8}.$$

3. The zoom lens system according to claim 1, wherein when the zoom ratio is to be varied, the third and fifth lens groups GR3 and GR5 are moved together axially of the lenses.

4. The zoom lens system according to claim 1, wherein a back focal length (equivalent air conversion table), taken as Twbf, at the wide angle end and focal length, taken as fw, at the wide angle end of the whole lens system meet the following condition (9), $$0.2 < Twbf/fw < 1.2 \qquad (9).$$

5. The zoom lens system according to claim 1, wherein the sixth lens group GR6 includes at least one concave lens having a negative refractive power and one convex lens having a positive refractive power, arranged in this order from the side of an object; and a lateral magnification, taken as βtg6, at the telephoto end of the sixth lens group GR6 should desirably meet the following condition (10), $$1.1 < \beta tg6 < 2.0 \qquad (10).$$

6. The zoom lens system according to claim 1, wherein at least one side of each lens included in the fifth lens group GR5 is formed aspheric.

7. The zoom lens system according to claim 1, wherein when varying the zoom ratio from the wide angle to telephoto side, the first lens group GR1 is moved once to the image surface side and then to the object side.

8. The zoom lens system according to claim 1, wherein when varying the zoom ratio from the wide angle to telephoto, the distance between the fourth lens group GR4 to fifth lens group GR5 is decreased from the wide angle end to the intermediate focal length and then increased from the intermediate focal length to telephoto end, and the distance, taken as DT(4-5) between the fourth and fifth lens groups GR4 and GR5 and focal length, taken as fg4, of the fourth lens group GR4 meet the following condition (11), $$3 < |fg4/DT(4-5)| < 6 \qquad (11).$$

9. An imaging device including a zoom lens system including a plurality of lens groups and in which the zoom ratio is varied by changing the distance between the adjacent lens groups and image sensing devices to convert an optical image formed by the zoom lens system into an electrical signal, the zoom lens system comprising at least:

a first lens group GR1 having a positive refractive power;
a second lens group GR2 having a negative refractive power;
a third lens group GR3 having a positive refractive power;
a fourth lens group GR4 having a negative refractive power;
a fifth lens group GR5 having a positive refractive power; and
a sixth lens group GR6 having a negative refractive power, arranged sequentially from the object side,
zoom ratio being varied by changing the distance between the adjacent lens groups,
the distance, taken as DW(i-j), between the i- and j-th lens groups at the wide angle end during at-infinity imaging and that, taken as DT(i-j), between the i- and j-th lens groups at the telephoto end during at-infinity imaging meeting the following conditions (1), (2), (3), (4) and (5)

$$DW(1-2) < DT(1-2) \qquad (1)$$

$$DW(2-3) > DT(2-3) \qquad (2)$$

$$DW(3-4) > DT(3-4) \qquad (3)$$

$$DW(4-5) < DT(4-5) \qquad (4)$$

$$DW(5-6) < DT(5-6) \qquad (5), and$$

focusing being made by moving the fourth lens group GR4 axially of the lenses.

10. The imaging device according to claim 9, wherein the fourth lens group GR4 is formed from a single concave lens; and a focal length, taken as fg4, of the fourth lens group GR4, that, taken as fw, at the wide angle end of the whole lens system, refractive index, taken as Ndg4, along the d line of the fourth lens group GR4 and Abbe constant, taken as Vdg4, along the d line of the fourth lens group GR4 meet the following conditions (6), (7) and (8), $$1.5 < |fg4/fw| < 3.5 \qquad (6)$$

$$1.8 < Ndg4 \qquad (7)$$

$$25 < Vdg4 \qquad (8).$$

11. The imaging device according to claim 9, wherein when the zoom ratio is to be varied, the third and fifth lens groups GR3 and GR5 are moved together axially of the lenses.

12. The imaging device according to claim 9, wherein a back focal length (equivalent air conversion table), taken as Twbf, at the wide angle end and focal length, taken as fw, at the wide angle end of the whole lens system meet the following condition (9), $$0.2 < Twbf/fw < 1.2 \qquad (9).$$

13. The imaging device according to claim 9, wherein the sixth lens group GR6 includes at least one concave lens having a negative refractive power and one convex lens having a positive refractive power, arranged in this order from the side of an object, and a lateral magnification, taken as βtg6, at the telephoto end of the sixth lens group GR6 meets the following condition (10), $$1.1 < \beta tg6 < 2.0 \qquad (10).$$

14. The imaging device according to claim 9, wherein at least one side of each lens included in the fifth lens group GR5 is formed aspheric.

15. The imaging device according to claim 9, wherein when varying the zoom ratio from the wide angle to telephoto side, the first lens group GR1 is moved once to the image surface side and then to the object side.

16. The imaging device according to claim 9, wherein when varying the zoom ratio from the wide angle to telephoto, the distance between the fourth lens group GR4 to fifth lens group GR5 is decreased from the wide angle end to the intermediate focal length and then increased from the intermediate focal length to telephoto end, and the distance, taken as DT(4-5) between the fourth and fifth lens groups GR4 and GR5 and focal length, taken as fg4, of the fourth lens group GR4 meet the following condition (11), $$3 < |fg4/DT(4-5)| < 6 \qquad (11).$$

* * * * *